June 29, 1937.  E. PFLÜGER  2,085,271
VEHICLE CONTROL MECHANISM
Filed Oct. 5, 1934  3 Sheets-Sheet 1
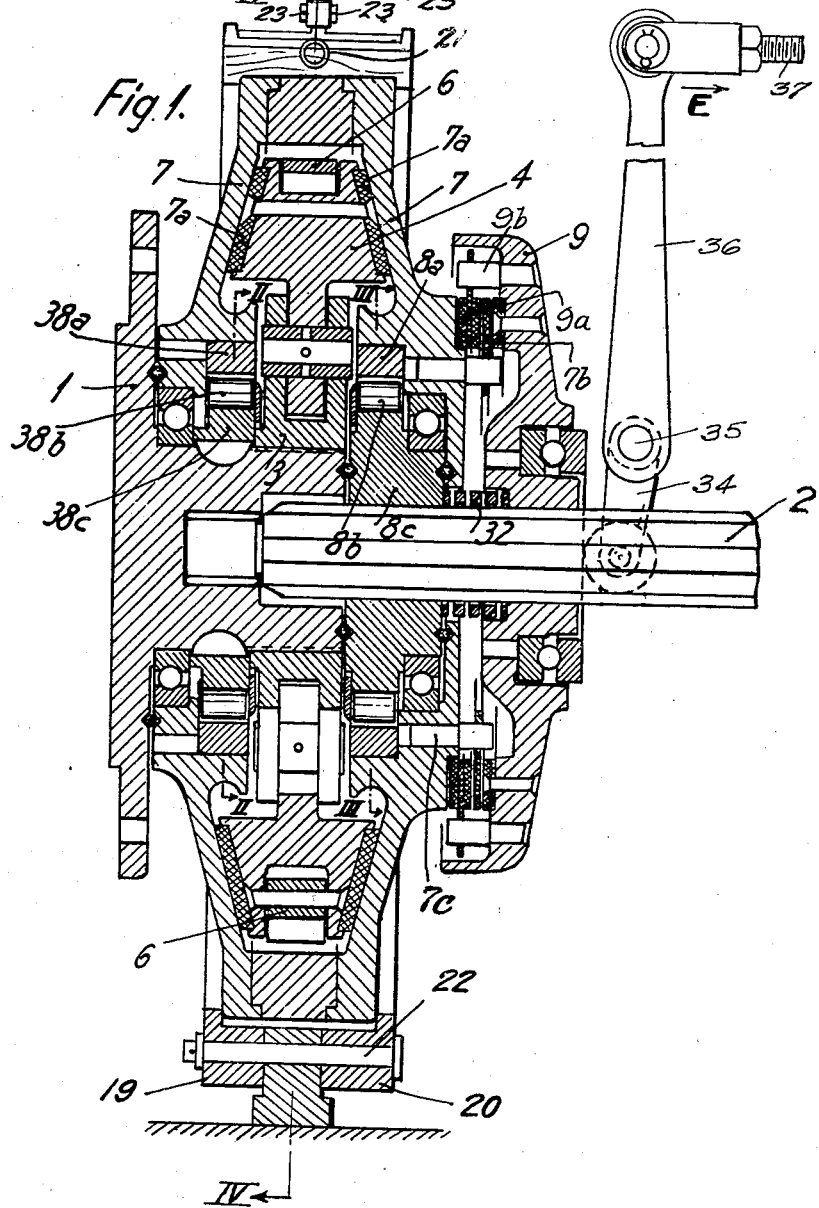
Inventor
Ernst Pflüger June 29, 1937. E. PFLÜGER 2,085,271
VEHICLE CONTROL MECHANISM
Filed Oct. 5, 1934 3 Sheets-Sheet 2
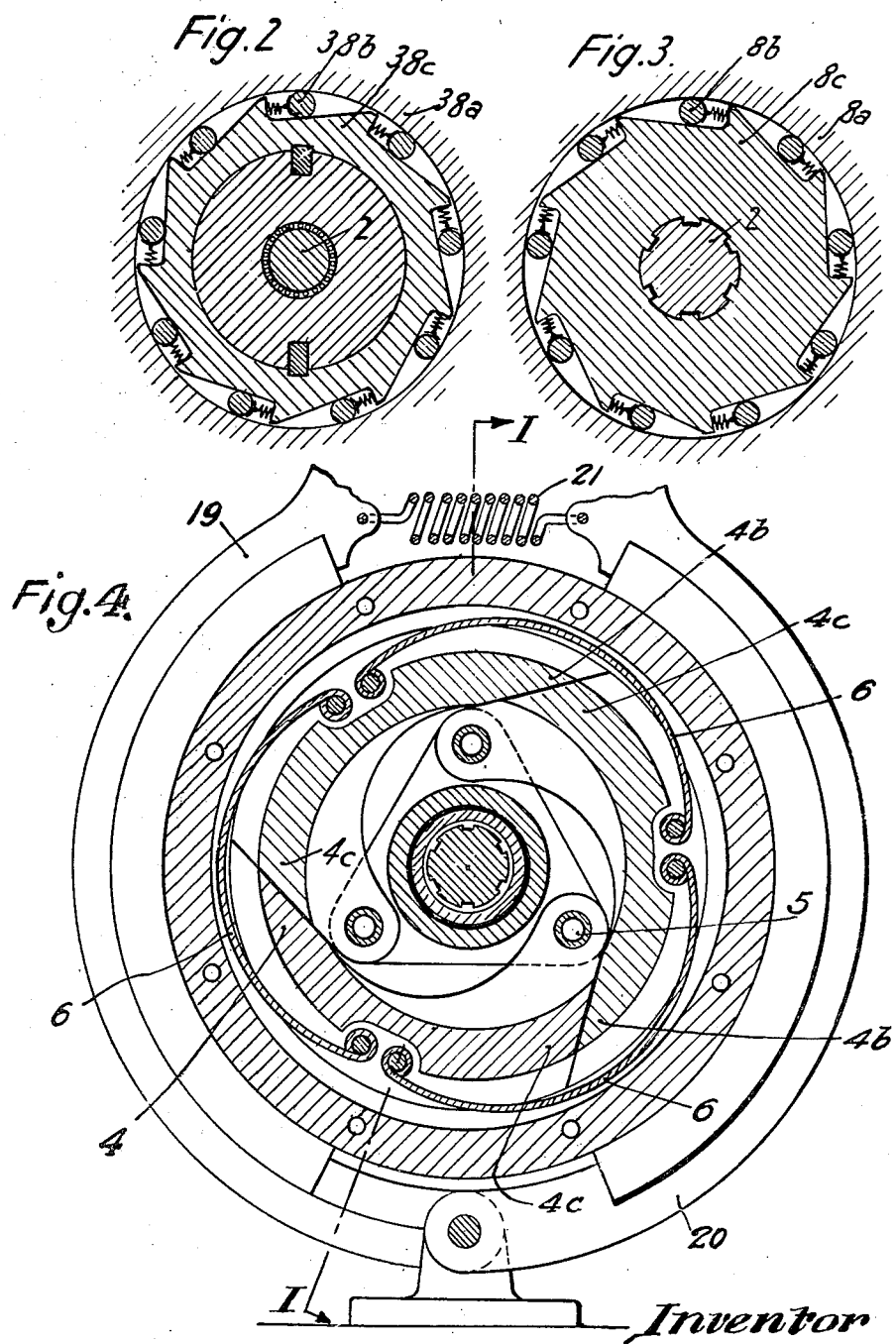

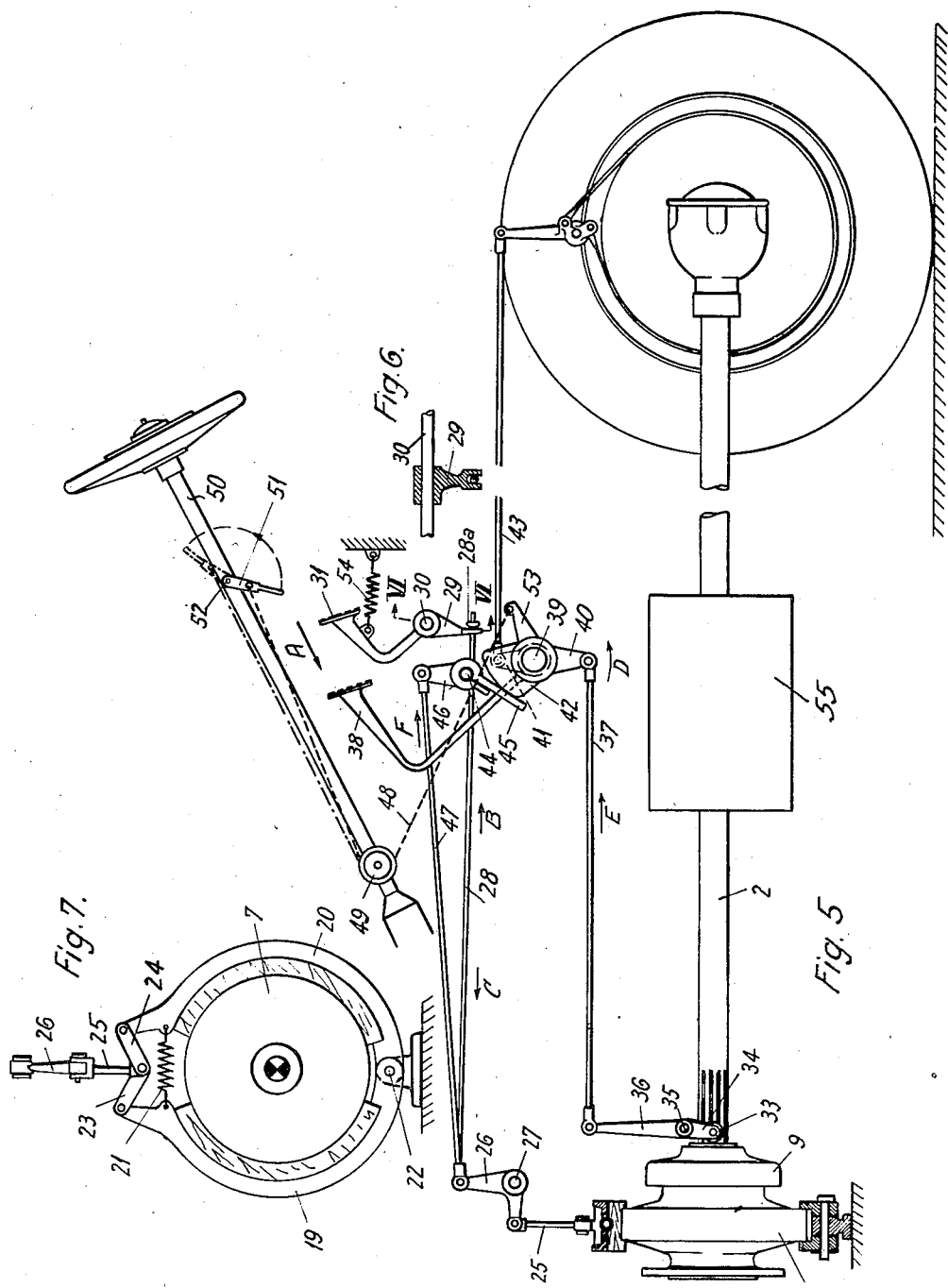

Patented June 29, 1937

2,085,271

UNITED STATES PATENT OFFICE 2,085,271

VEHICLE CONTROL MECHANISM

Ernst Pflüger, Vaduz, Liechtenstein

Application October 5, 1934, Serial No. 746,987
In Switzerland October 4, 1933

3 Claims. (Cl. 192—.01)

The present invention relates to a vehicle control mechanism, and more particularly to a centrifugal coupling provided with an overrunning clutch, for use on motor vehicles.

The characteristic feature of the invention resides in the fact that the member serving for actuating the vehicle brakes is operatively connected with the actuating mechanism of the overrunning clutch and also with the actuating mechanism of a coupling brake in such manner that the actuation of the said vehicle brake actuating member first causes locking of the overrunning clutch in order to connect the engine with the drive of the vehicle, and that at the same time the opening of the coupling brake, which is operative when the fuel admission control pedal is released, is effected, the vehicle brakes only coming into operation after the further actuation of the brake actuating members associated with said vehicle brakes.

The accompanying drawings illustrate embodiments of the invention. The views of the drawings are as follows:

Figure 1 is a cross-section of a friction coupling constructed as an automatic centrifugal coupling, the said cross-section being taken on line I—I of Fig. 4, Figure 2 is a sectional view of the friction coupling cut along the line II—II in Figure 1, Figure 3 is a sectional view of the friction coupling cut along the line III—III in Figure 1, Figure 4 is a further sectional view of the friction coupling cut along the line IV—IV in Figure 1, Figure 5 is a lateral view of various controls necessary to the functioning of motor and coupling, Figure 6 is a section along the line VI—VI in Figure 5 and Figure 7 is a side elevation of a so-called coupling brake.

In the embodiment of the invention illustrated 1 depicts a flange connected with the driving shaft, and 2 the driven shaft. To the flange 1 is firmly affixed a disk 3. 4 are segment-shaped centrifugal bodies, wedge-shaped in cross-section, which at one end are attached jointedly to the disk 3 by means of bolts 5. The centrifugal bodies 4 are connected to each other by peripherally arranged bow-shaped spring bands 6. These springs tend to keep the centrifugal bodies 4 from engaging with the housing 7. The centrifugal bodies 4 are so arranged that their free ends 4b overlap with the neighbouring fixed ends 4c. 7a illustrates a wedge-shaped groove in the housing 7, with which the outer part 8a of a cylinder lock acting as overrunning clutch and of ordinary structure, is firmly connected. 8b are the rollers of this overrunning clutch, and 8c depicts the inner part thereof which is firmly connected to the driven shaft 2.

9 is a coupling disk, axially movable along the driven shaft 2, yet secured against rotation relative to said shaft. The driven shaft 2 is connected to a transmission gear box 55 (Fig. 5). Between the gear box and the housing 7 is arranged a friction coupling whose friction surfaces 9a are connected with the coupling disk 9 and whose friction surface 7b are connected with the housing 7 by pins 7c, in such a manner that they are movable axially but secured against rotation relative to housing 7. A spring 32 tends to keep the friction surfaces from engaging.

The coupling member 9a is of larger diameter than the other coupling members. The projecting annular surface of the said first-named coupling member is provided with a number of holes with which a corresponding number of pins 9b rigidly connected to the coupling disc 9 engage, the said pins serving as power transmitting members for the said coupling disc. The coupling member 7b is of smaller diameter than the other members of the coupling. The inwardly projecting annular surface of the coupling member 7b is provided with a number of holes in which a corresponding number of pins 7c rigidly connected to the housing 7 engage, the said pins 7c serving as power transmitting members for the housing 7 of the coupling. If frictional mechanical connection between the members of the coupling is brought about by displacing the coupling disc 9 from the left towards the right, the housing 7 becomes coupled with the coupling disc 9 and consequently also with the shaft 2.

By means of rollers 33, a fork 34 a lever 36 pivoting on an axis 35, and a rod 37, the coupling disk 9 can be thrust against the action of the spring 32, and the friction coupling thus engaged.

Besides the overrunning clutch 8a, 8b and 8c, a further overrunning clutch is arranged between the part 1 of the driving shaft and the housing 7. This consists mainly of an outer part 38a, connected to the housing 7, an inner part 38c connected to the flange 1, and the rollers 38b. This overrunning clutch is so constructed that on the one hand it enables the driving shaft 1 to rotate faster than the housing 7, but on the other hand prevents the housing from rotating faster than the driving shaft.

The housing 7 is again depicted in Figure 7. 19 and 20 are brake-blocks, thrust in the position illustrated against the housing by a spring 21. They pivot on the fixed axis 22. On the side opposite the pivot 22 the brake-blocks 19 and 20 are connected to toggle links 23, 24, the latter being in turn affixed to one end of a link-rod 25, the other end of which is jointed to one arm of an L shaped lever 26, pivoting on a fixed axis 27. The other arm of the lever 26 is affixed to a connecting-rod 28, which ends in a forked control lever 29 (Fig. 5), acting on a fixed axis 30. 31 depicts the accelerator, which is also firmly mounted on the pivot 30.

38 (Fig. 5) depicts the foot-brake pedal of the vehicle, which is firmly connected to the shaft 39. The levers 41, 40 and 53, as well as the cam 42, are also in fixed connection with the shaft 39. The connecting-rod 37 joins the lever 40 to the lever 36 (Fig. 1), while the connecting-rod 43 terminating at the lever 41 leads to the friction brakes of the vehicle.

On a shaft 44 is mounted a double-armed lever, one arm 45 of which lies against the cam 42, the other arm 46 being connected to a connecting-rod 47. The latter, similar to the connecting-rod 28, is attached the lever 26 (Figs. 5 and 7).

A control 48 is affixed to the free end of the lever 53 and runs over a pulley 49 and leads to a manipulating lever 51 mounted on the steering-column 50 and pivoted at 52.

If the lever 51 is set in position as shown in dotted lines, then the clutch 9a, 7b is engaged, but the vehicle brake is not engaged; this latter enters into action solely after a movement which exceeds the way described by the lever 51. By pressing the pedal 38 downwards, first the coupling is engaged and only after further pressure the main wheel brakes become operative.

The connecting-rod 28 is connected to the lever 29 in such a manner that when the accelerator 31 is moved in the direction indicated by the arrow A, the connecting-rod 28 is moved correspondingly. The latter, however, can also move in the direction indicated by arrow B without affecting the position of the accelerator 31; in this case the rod 28 slides in the lever 29, the stop 28a affixed to the rod 28 moving away from the lever 29.

The operation of the above-mentioned mechanism is as follows: With a slow-running motor the flange 1, disk 3 and centrifugal bodies 4 revolve with it. The tension of the springs 6 is thereby so adjusted that it outweighs the centrifugal force affecting the centrifugal bodies when the drive shaft is rotating slowly during the number of so-called free-wheel or idle revolutions, i. e. during the period when the engine is rotating at such a speed that the centrifugal bodies 4 are not in engagement with the housing 7. But as soon as the centrifugal bodies turn more rapidly they move outwards under the action of the swiftly-increasing centrifugal force, till they come to lie in the groove 7a of the housing 7. By the friction thus caused between the centrifugal bodies and the housing 7 a corresponding moment of torsion is exerted on the shaft 2, via the overrunning clutch 8a, 8b, 8c, which acts as a locking member in the one rotary direction. At the instant when the moment of torsion caused by the above-mentioned friction exceeds the moment of resistance exerted by the shaft 2, this shaft and with it the vehicle is set in motion. If, on the other hand, the conveyance of gas to the motor be wholly or partially cut off when the vehicle is in motion, the motor tends to reduce the rotatory speed. At the moment when the drive shaft, i. e. the flange 1 tends to drag behind with respect to the shaft 2, the overrunning clutch begins to function (8a, 8b, 8c), whilst the vehicle and also the shaft 2 continue to move at approximately the same speed in consequence of the kinetic energy accumulated in the momentum of the vehicle. Should the revolutions of the motor continue to diminish until finally the centrifugal force exerted by the centrifugal bodies 4 becomes less than the tension of the spring 6 (which, as mentioned above, is the case when the motor is running light, i. e. free-wheeling), then the centrifugal bodies disengage with the groove 7a of the housing 7, whereby the coupling is released.

Simultaneously with the cutting off of gas from the motor, which is effected by releasing the accelerator 31 (Fig. 5) when the later moves against the direction of the arrow A under the impulse of a spring 54, the connecting-rod 28 moves in the direction of the arrow C (Fig. 5) under the impulse of the spring 21 (Fig. 7), whereby the brake-blocks 19 and 20 come to lie against the housing 7 and act as a check upon it.

By means of this arrangement a smooth gear-change can in many cases be effected. Assuming, for instance, that the vehicle is in motion and the motor throttled down to "free-wheel", the "gear" (i. e. the several mutually engaging gear-wheels) becomes disengaged and, also simultaneously, the car checked. In this case the centrifugal bodies 4 have already disengaged themselves from the groove 7a of the housing 7. Without a device of this kind the housing 7 would now continue to rotate for some time owing to its not inconsiderable momentum, and the same applies to the shaft-butt 2 which is connected to the gearing. If two gear-wheels are now made to engage once more with the object of setting the vehicle in motion, great difficulty would be encountered (as has been proved in practice) owing to the still revolving houses 7 and stub shaft 2, and also in consequence of the relatively differing speed of rotation of the two gear-wheels to be engaged.

It will be understood that the stub shaft 2 is connected with the gear box. When the change gears are out of engagement with one another, i. e. when the gear is running idly the stub shaft 2 can thus rotate independently of the movement of the vehicle.

The instance above mentioned occurs in practice with great frequency, especially in towns when cars are driven close behind one another and continuous manoeuvring is necessary.

When the car is on a long run downhill it is advisable to employ the motor as brake by allowing it to be driven (i. e. without gas) by the moving vehicle.

For this purpose the lever 51 (Fig. 5) is moved to the alternative position indicated by dotted lines, thereby drawing upon the control lead 48 and shifting the lever 53, the axis 39 and the lever 40 in the direction indicated by arrow E (Figs. 1 and 5). By this action the coupling disk 9 (Fig. 1) is thrust by the action of 33—37 against the impulse of the spring 32 and in the direction of the housing 7, thus causing the friction coupling 7b, 9a, to engage. In consequence of this the driven shaft 2 rotates with the housing 7 and the action of the overrunning clutch 8a, 8b, 8c is interrupted. When the shaft 2 revolves the housing 7 is also made to rotate, which movement is transmitted via the overrunning clutch 38a, 38b and 38c to the flange 1 and from here to the motor.

Besides the manner described, the engaging of the friction coupling 7b, 9a can be effected in another manner, namely by pressing the brake pedal 38. By this action the shaft 39 and the lever 40 are again shifted in the direction indicated by arrow D and the mechanism 33—37 set in function by the connecting-rod 37. Simultaneously, the cam 42 is also shifted and now presses on the arm 45, causing the arm 46 and the connecting-rod 47 to move in the direction indicated by arrow F. This movement in turn straightens out the knee-lever 23, 24 and removes the brake-blocks 19, 20 from the housing 7.

From the above it will be understood that the operation described, namely the locking of the overrunning clutch with simultaneous release of the braking blocks of the coupling brake can be effected either by means of the lever 51 or by means of the pedal 38, the difference between these two modes of operation residing, however, in the fact that by means of the lever 51 a permanent locking of the overrunning clutch can be obtained, as is desirable in the case of long journeys down inclines or along valleys, whereas when the pedal 38 is used the locking of the overrunning clutch can be directly controlled by the driver at any moment.

As the coupling brake (i. e. the housing brake) 19, 20 is released immediately the friction coupling 7b, 9a is engaged and thereby the motor made to function as a brake, premature wear on the lining of the brake-blocks 19, 20 is avoided. The coupling brake is solely intended for checking the housing 7 for the purpose of smooth gear-changing and should only be used for this.

The rod 43 connected to the friction brakes of the vehicle has always adequate back lash. The rod 37, however, leading to the friction coupling 7b, 9a is mounted with as little play as possible and the ratio of the levers 38, 40 and 36 so selected as to bring the friction coupling into action as soon as possible before the play on the rod 43 has been bridged.

In this manner small and medium-strength applications of the brake can be effected by the braking-effect of the motor, and the actual friction brakes reserved for vigorous braking, thus protecting them from overstrain so that it is not necessary to fit such powerful brakes as in the case of vehicles not equipped with overrunning clutches.

I claim:
1. A centrifugal coupling for use on motor vehicles, comprising in combination: an overrunning clutch adapted to be locked at will; a coupling brake operating in combination with said overrunning clutch, vehicle brakes; and interconnected means for actuating said overrunning clutch, said coupling brake and said vehicle brakes respectively in such manner that when said vehicle brakes are being put into operation, said overrunning clutch is first locked and the engine is coupled to the vehicle wheels, whilst at the same time the coupling brake is opened, whereupon the vehicle brakes come into operation.

2. A centrifugal coupling for use on motor vehicles, comprising in combination: an overrunning clutch; a coupling brake co-operating with said overrunning clutch and adapted to be used in gear-changing; vehicle brakes; a member for actuating said vehicle brakes; means for cutting out said overrunning clutch operatively connected with said vehicle brake actuating member; means for actuating said coupling brake operatively connected with said vehicle brake actuating member; and a fuel admission control pedal interconnected with said aforenamed elements of the structure; whereby the actuation of said vehicle brake actuating member first causes said overrunning clutch to be locked and the engine to be coupled to the vehicle wheels whilst at the same time the opening of the coupling brake, which is in operation when said pedal is released, is effected, said vehicle brakes associated with the said vehicle brake actuating member only coming into operation when the latter is further operated.

3. A centrifugal coupling for use on motor vehicles, comprising in combination: an overrunning clutch; a coupling brake co-operating with said overrunning clutch and adapted to be used in gear-changing; vehicle brakes; a member for actuating said vehicle brakes; means for cutting out said overrunning clutch operatively connected with said vehicle brake actuating member; means for actuating said coupling brake operatively connected with said vehicle brake actuating member; and a fuel admission control pedal interconnected with said aforenamed elements of the structure; whereby the actuation of said vehicle brake actuating member first causes said overrunning clutch to be locked and the engine to be coupled to the vehicle wheels whilst at the same time the opening of the coupling brake, which is in operation when said pedal is released, is effected, said vehicle brakes associated with the said vehicle brake actuating member only coming into operation when the latter is further operated; the interconnection between said control pedal and the other elements comprising transmission members connecting said control pedal with said coupling brake actuating means, said transmission members being associated with said control pedal in such manner that a movement of said control pedal in the direction for accelerating the engine causes the opening of the coupling brake, but that when the coupling brake is opened by operating said vehicle brake the movement of the parts of said coupling brake thereby caused is not transmitted to said control pedal.

ERNST PFLÜGER.